(12) United States Patent
Laursen

(10) Patent No.: US 8,387,331 B2
(45) Date of Patent: Mar. 5, 2013

(54) WIND TURBINE TOWER

(75) Inventor: Christian Laursen, Hedensted (DK)

(73) Assignee: Siemens Aktiengesellschaft, München (DE)

( * ) Notice: Subject to any disclaimer, the term of this patent is extended or adjusted under 35 U.S.C. 154(b) by 48 days.

(21) Appl. No.: 13/167,977

(22) Filed: Jun. 24, 2011

(65) Prior Publication Data

US 2012/0000158 A1    Jan. 5, 2012

(30) Foreign Application Priority Data

Jul. 2, 2010    (EP) .................................... 10168260

(51) Int. Cl.
*E04H 12/00* (2006.01)
*F16C 35/00* (2006.01)

(52) U.S. Cl. ....... 52/655.1; 52/40; 52/173.1; 52/651.07; 52/745.17; 29/525.07; 29/467; 403/87

(58) Field of Classification Search ............... 403/408.1, 403/335–338, 257, 83, 84, 87; 52/651.07, 52/655.1, 745.17, 745.19, 40, 301, 154, 698–711; 416/244 R; 29/525.01, 525.02, 525.11, 525.13, 29/434, 467, 441.1
See application file for complete search history.

(56) References Cited

U.S. PATENT DOCUMENTS

| | | | | |
|---|---|---|---|---|
| 2,073,889 A * | 3/1937 | Trout | ............................ | 52/282.4 |
| 2,284,898 A * | 6/1942 | Hartman | ....................... | 52/654.1 |
| 3,480,305 A * | 11/1969 | Jureit | .......................... | 403/408.1 |
| 3,877,641 A * | 4/1975 | Plourde | ......................... | 238/234 |
| 3,971,179 A * | 7/1976 | Bodocsi et al. | ............. | 52/223.11 |
| 6,073,405 A * | 6/2000 | Kasai et al. | ...................... | 52/283 |
| 6,681,538 B1 * | 1/2004 | Sarkisian | ......................... | 52/289 |
| 7,000,304 B2 * | 2/2006 | Sarkisian | ......................... | 29/434 |
| 7,047,699 B2 * | 5/2006 | Kennedy | .......................... | 52/184 |
| 7,644,962 B2 * | 1/2010 | Crouse | .......................... | 285/412 |
| 7,877,935 B2 * | 2/2011 | Ollgaard | ............................ | 52/40 |
| 2002/0084142 A1 * | 7/2002 | Brennan et al. | ............... | 182/133 |
| 2005/0141954 A1 * | 6/2005 | Mieger et al. | ............... | 403/109.5 |
| 2008/0285903 A1 * | 11/2008 | Olsen | ............................ | 384/516 |
| 2009/0090069 A1 | 4/2009 | Willis | | |
| 2010/0250013 A1 * | 9/2010 | Birkemose et al. | ........... | 700/287 |

FOREIGN PATENT DOCUMENTS

| | | |
|---|---|---|
| DE | 102008016925 A1 | 10/2009 |
| EP | 1889987 A1 | 2/2008 |
| JP | 2010144822 A * | 7/2010 |

* cited by examiner

*Primary Examiner* — Jeanette E. Chapman

(57) ABSTRACT

A wind turbine tower which includes a number of sections, connected by bolted joints is disclosed. A bolted joint includes at least one connection of the bearing type and at least one connection of the slip resistant at serviceability type. In one aspect, the bearing type connection includes at least one non prestressed bolt and/or the connection of the slip resistant at serviceability type includes at least one prestressed bolt.

20 Claims, 1 Drawing Sheet

WIND TURBINE TOWER

CROSS REFERENCE TO RELATED APPLICATIONS

This application claims priority of European Patent Office application No. 10168260.7 EP filed Jul. 2, 2010, which is incorporated by reference herein in its entirety.

FIELD OF INVENTION

The present invention relates to a wind turbine tower comprising a number of sections, connected by bolted joints.

BACKGROUND OF INVENTION

Wind turbine towers are normally constructed of a number of sections with a cylindrical or conical shape. These sections are prefabricated in a workshop and transported to the place of installation, where they are connected to a wind turbine tower. Typically the sections are connected by bolted joints, comprising nuts and bolts which connect two neighbouring overlapping end sections. The sections are provided with holes, arranged in circumferential direction, through which bolts are inserted in order to form the bolted joints.

The type of connection and the number and size of the required bolts is determined by the magnitude of the expected loads and the number of load cycles with low or high load. For the dimensioning in particular the shear loads are relevant.

Until now typically only prestressed bolts of the "slip resistant at ultimate limit state" type are used for wind turbine towers. Bolts of this kind are appropriate for applications with a low static load capacity and a very high fatigue capacity. During normal operation and when an extreme load occurs loads are transferred as friction by bolts of the slip resistant at ultimate limit state type.

However, when bolts of this type are used, which is denoted as category C in European standard EN 1090, a large number of bolts is needed, which leads to high production costs.

SUMMARY OF INVENTION

It is therefore an object of the present invention to provide a wind turbine tower which requires less bolts.

According to the present invention this object is achieved in the above defined wind turbine tower in that a bolted joint comprises at least one connection of the bearing type and at least one connection of the slip resistant at serviceability type.

The present invention is based on the idea that shear loads which occur during normal operation of a wind turbine can be transferred as friction, this type of connection has the very best fatigue performance. Therefore bolts of the bearing type are used, this type is also known as category A in European standard EN 1090. Bolts of this type are able to transfer loads as shear stress in the bolt shaft. Preferably bolts from class 4.6 up to and including class 10.9 can be used. In addition bolts of the slip resistant at serviceability type are used, which is also denoted as category B in European standard EN 1090. Bolts of this type are able to transfer loads during normal operation as friction. Preferably preloaded (prestressed) bolts from class 8.8 or 10.9 can be used. Extreme loads are transferred as shear stress in the bolt shaft. Compared to bolts of category C less bolts are needed, therefore production costs for the inventive wind turbine tower are lowered.

According to the present invention the bearing type connection of the inventive wind turbine tower may comprise at least one non prestressed bolt. Such bolts stand out due to their very high static load capacity, further a very low fatigue capacity is typical of them.

In the inventive wind turbine tower the connection of the slip resistant at serviceability type may comprise at least one prestressed bolt. Bolts of this type stand out for a medium static load capacity and a medium fatigue capacity.

According to a further development of the inventive wind turbine tower the bolted joint may comprise at least one bolt of the bearing type connection and at least two bolts of the slip resistant at serviceability type, whereby the bolt of the bearing type connection is positioned between the slip resistant at serviceability type bolts. It has been found out that this combination is appropriate for the static loads as well as for the fatigue loads. In particular the bolt of the bearing type is appropriate for the static loads, whereas the bolts of the slip resistant at serviceability type have the required high fatigue capacity. At least one bolt of the bearing type connection and at least two bolts of the slip resistant at serviceability type form the connection of bolted joints, whereby the bolts are arranged in circumferential direction of the sections.

Preferably the at least one bolt of the bearing type connection of the inventive wind turbine tower may have a narrow hole tolerance, whereas the at least one bolt of the slip resistant at serviceability type bolt has a loose hole tolerance.

In the inventive wind turbine tower it is particular preferred that a connection of two sections comprises several rows of bolts in circumferential direction. Preferably the bolts are positioned with an equal distance between them. Between the bolt head and the tubular or circular section a washer may be arranged, a further washer may be arranged between the nut and the section.

A very good reliability is obtained when a connection of two sections of the inventive wind turbine tower comprises at least one row of bolts of the bearing type connection and at least two rows of bolts of the slip resistant at serviceability type, whereby the row of bolts of the bearing type connection is positioned between the rows of the slip resistant at serviceability type bolts. Such a connection results in a joint that has a fatigue capacity and a static load capacity that matches the load pattern of wind turbine towers.

The invention and its underlying principle will be better understood when consideration is given to the following detailed description of a preferred embodiment.

BRIEF DESCRIPTION OF THE DRAWINGS

In the accompanying drawings

DETAILED DESCRIPTION OF INVENTION

Figure 1:
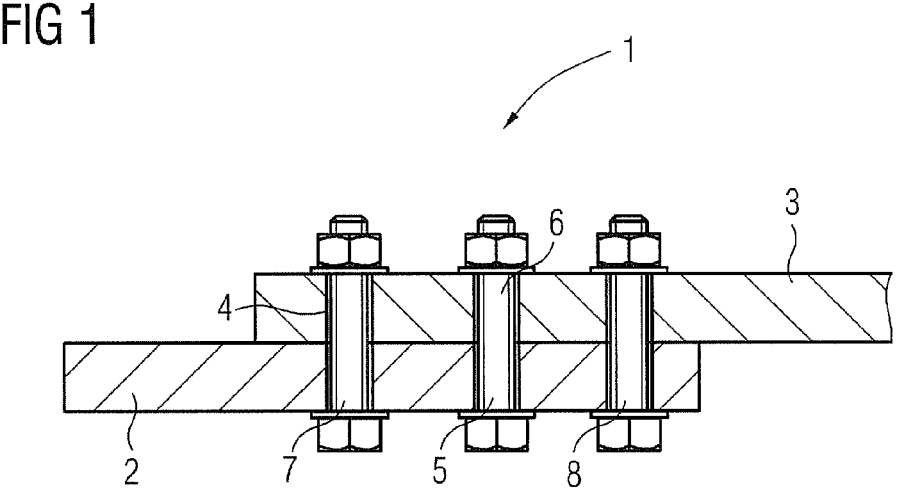
FIG. 1 shows a cross sectional view of a bolted joint of an inventive wind turbine tower.
Figure 2:
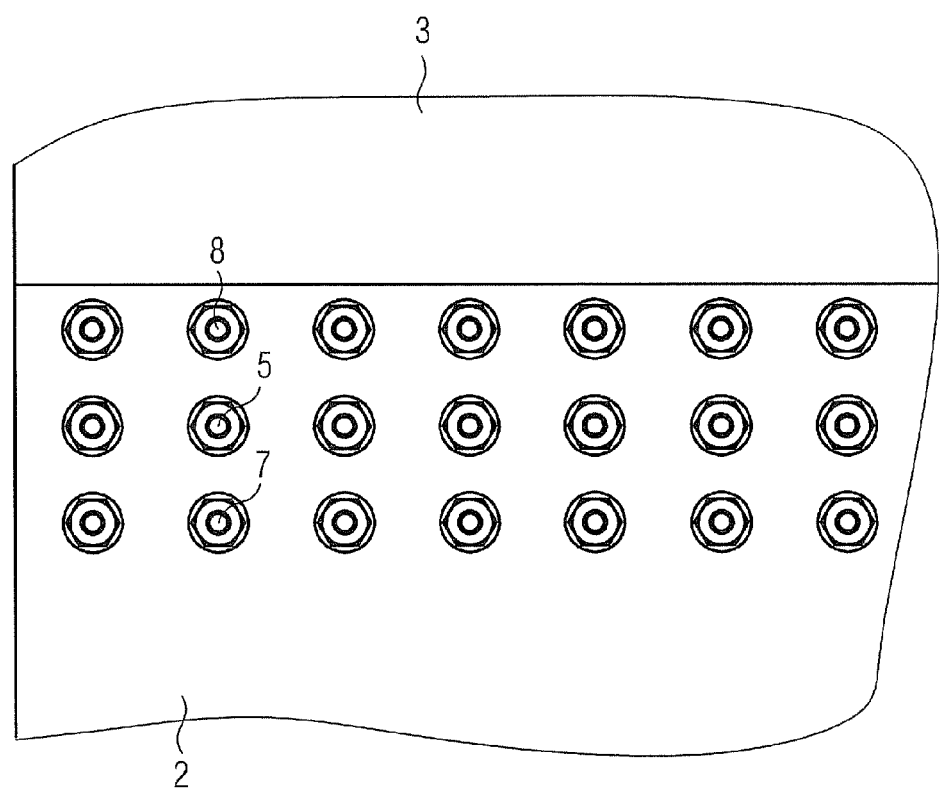
FIG. 2 shows a portion of the connection of the inventive wind turbine tower.

A bolted joint 1 comprises a first section 2 and a second section 3 which are provided with three rows of holes 4 which are arranged parallel in circumferential direction. Plural sections are bolted as shown in FIG. 2 in order to form a wind turbine tower.

A central row of bolts 5 of the bearing type is used, which is specified as category A in European standard EN 1090. Bolt 5 is non prestressed and offers a very high static load capacity. In contrast to that bolt 5 has a very low fatigue capacity which means that bolts of category A alone do not offer the required fatigue capacity for a wind turbine tower. Loads are transferred from bolt 5 as shear stress in the bolt shaft 6. In the present case bolt 5 belongs to bolt class 4.6.

In addition the bolted joint 1 comprises two rows of bolts 7, 8 between which the row of bolts 5 is arranged. Bolts 7, 8 have a loose hole tolerance, whereas bolts 5 have a narrow hole tolerance. The bolts 7, 8 are of the slip resistant at serviceability type, which is denoted as category B in European standard EN 1090. Bolts 7, 8 are prestressed bolts which show a medium static load capacity and a medium fatigue capacity. During normal operation load is transferred as friction, extreme high loads are transferred as shear stress through the bolt shafts. Bolts 7, 8 offer the required static load capacity, however, they would yield when subjected to additional shear stresses during an extreme load. This causes a lot of prestress and the joint would loose its fatigue capacity. Therefore in the bolted joint 1 a combination of bolts 5 and bolts 7, 8 is used which has a fatigue capacity and a static load capacity as well. Bolts 7, 8 belong to bolt class 10.9.

During the many cycles of normal operation load is transferred through bolts 7, 8 of category B, during an extreme load the load is transferred both through bolts 5 and bolts 7, 8, but without harming the bolts 7, 8, since they will never come into contact with the sections 2, 3 and be subjected to shear stresses.

In the bolted joint 1 of the figure the bolts 5 and bolts 7, 8 are highly utilized which leads to a reduction of the required number of bolts 5, 7, 8.

The invention claimed is:

1. A wind turbine tower comprising:
   a plurality of sections, two adjacent and overlapping sections connected by
   a bolted joint which comprises a bearing type bolt and a slip resistant at serviceability type bolt.

2. The wind turbine tower according to claim 1, wherein the bearing type bolt is non prestressed bolt.

3. The wind turbine tower according to claim 1, wherein the slip resistant at serviceability type bolt is a prestressed bolt.

4. A wind turbine tower according,
   a plurality of sections, connected by bolted joints,
   a bolted joint comprises at least one bearing type connection and at least one slip resistant at serviceability type connection,
   wherein the bolted joint comprises at least one bolt of the bearing type connection and at least two bolts of the slip resistant at serviceability type, whereby the bolt of the bearing type connection is positioned between the slip resistant at serviceability type bolts.

5. The wind turbine tower according to claim 1, wherein the bearing type bolt has a narrow hole tolerance, wherein the slip resistant at serviceability type bolt has a loose hole tolerance.

6. The wind turbine tower according to claim 1, wherein a connection of two sections comprises several rows of bolts in circumferential direction.

7. The wind turbine tower according to claim 6, wherein the connection of two sections comprises at least one row of the bearing type bolts and at least two rows of the slip resistant at serviceability type bolts, wherein the row of the bearing type bolts is positioned between the rows of the slip resistant at serviceability type bolts.

8. The wind turbine tower according to claim 2, wherein the slip resistant at serviceability type bolt is a prestressed bolt.

9. The wind turbine tower according to claim 2, wherein the bolted joint comprises at least two of the slip resistant at serviceability type bolts, wherein the bearing type bolt is positioned between the slip resistant at serviceability type bolts.

10. The wind turbine tower according to claim 3, wherein the bolted joint comprises at least two of the slip resistant at serviceability type bolts, wherein the bearing type bolt is positioned between the slip resistant at serviceability type bolts.

11. The wind turbine tower according to claim 2, wherein the bearing type bolt has a narrow hole tolerance, wherein the slip resistant at serviceability type bolt has a loose hole tolerance.

12. The wind turbine tower according to claim 3, wherein the bearing type bolt has a narrow hole tolerance, wherein the slip resistant at serviceability type bolt has a loose hole tolerance.

13. The wind turbine tower according to claim 4, wherein the bearing type bolt has a narrow hole tolerance, wherein the slip resistant at serviceability type bolt has a loose hole tolerance.

14. The wind turbine tower according to claim 2, wherein a connection of two sections comprises several rows of bolts in circumferential direction.

15. The wind turbine tower according to claim 3, wherein a connection of two sections comprises several rows of bolts in circumferential direction.

16. The wind turbine tower according to claim 4, wherein a connection of two sections comprises several rows of bolts in circumferential direction.

17. The wind turbine tower according to claim 5, wherein a connection of two sections comprises several rows of bolts in circumferential direction.

18. The wind turbine tower according to claim 14, wherein the connection of two sections comprises at least one row of the bearing type bolts and at least two rows of the slip resistant at serviceability type bolts, wherein the row of the bearing type bolts is positioned between the rows of the slip resistant at serviceability type bolts.

19. The wind turbine tower according to claim 15, wherein the connection of two sections comprises at least one row of the bearing type bolts and at least two rows of the slip resistant at serviceability type bolts, wherein the row of the bearing type bolts is positioned between the rows of the slip resistant at serviceability type bolts.

20. The wind turbine tower according to claim 16, wherein the connection of two sections comprises at least one row of the bearing type bolts and at least two rows of bolts of the slip resistant at serviceability type, wherein the row of bolts of the bearing type bolts is positioned between the rows of the slip resistant at serviceability type bolts.

* * * * *